United States Patent
Lee et al.

(10) Patent No.: US 7,678,505 B2
(45) Date of Patent: Mar. 16, 2010

(54) ORGANIC ELECTROLYTIC SOLUTION AND LITHIUM BATTERY EMPLOYING THE SAME

(75) Inventors: Seok-soo Lee, Suwon-si (KR);
Young-gyoon Ryu, Suwon-si (KR);
Han-su Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 945 days.

(21) Appl. No.: 11/453,641

(22) Filed: Jun. 14, 2006

(65) Prior Publication Data

US 2006/0281011 A1    Dec. 14, 2006

(30) Foreign Application Priority Data

Jun. 14, 2005    (KR) ...................... 10-2005-0051122

(51) Int. Cl.
*H01M 10/40* (2006.01)
(52) U.S. Cl. ...................... 429/326; 429/330
(58) Field of Classification Search ........................ None
See application file for complete search history.

(56) References Cited

U.S. PATENT DOCUMENTS

| | | | |
|---|---|---|---|
| 5,352,548 A | 10/1994 | Fujimoto et al. | |
| 5,712,059 A | 1/1998 | Barker et al. | |
| 5,714,281 A | 2/1998 | Naruse et al. | |

FOREIGN PATENT DOCUMENTS

| | | |
|---|---|---|
| JP | 2002-313416 | 10/2002 |
| JP | 2002-359001 | 12/2002 |
| JP | 2003-323915 | 11/2003 |

OTHER PUBLICATIONS

Korean Patent Abstract, Publication No. 1020040020633 A, published on Mar. 9, 2004, in the name of Lee.
Megahed, et al., "Lithium-ion rechargeable batteries," Journal of Power Sources, 51 (1994) pp. 79-104.

*Primary Examiner*—Robert Hodge
(74) *Attorney, Agent, or Firm*—Christie, Parker & Hale, LLP

(57) ABSTRACT

An organic electrolytic solution and a lithium battery employing the same are provided. The organic electrolytic solution includes: a lithium salt; an organic solvent containing a high dielectric constant solvent and a low boiling point solvent; and an additive comprising a crotonate derivative including a substituted silyl group. The organic electrolytic solution and the lithium battery employing such an electrolytic solution suppress a reduction decomposition of a polar solvent and decrease irreversible capacity in the first cycle. Thus, the charge/discharge efficiency, lifespan, and reliability of the battery can be improved.

18 Claims, 2 Drawing Sheets

ORGANIC ELECTROLYTIC SOLUTION AND LITHIUM BATTERY EMPLOYING THE SAME

CROSS-REFERENCE TO RELATED PATENT APPLICATION

This application claims the benefit of and priority to Korean Patent Application No. 10-2005-0051122, filed in the Korean Intellectual Property Office on Jun. 14, 2005, the entire content of which is incorporated herein.

FIELD OF THE INVENTION

The present invention relates to an organic electrolytic solution capable of improving a battery charge/discharge cycle characteristics, and a lithium battery employing the organic electrolytic solution.

BACKGROUND

As portable electronic devices such as video cameras, cellular phones, notebook computers, etc., become more lightweight and have increasingly improved performance, research into batteries used as power supplies for such portable devices is being conducted. In particular, rechargeable lithium secondary batteries are being actively researched as they have three times the energy density per unit weight compared to conventional lead storage batteries, nickel-cadmium batteries, nickel-hydrogen batteries, nickel-zinc batteries, etc., and can be rapidly charged.

In general, since a lithium battery is generally driven at a high operating voltage, a conventional aqueous electrolytic solution cannot be used. This is because lithium contained in an anode and an aqueous solution vigorously react with each other. Thus, an organic electrolytic solution in which a lithium salt is dissolved in an organic solvent is generally used as the electrolyte in a lithium battery. Such organic solvents should generally have high ionic conductivity, a high dielectric constant and low viscosity. However, since it is difficult to obtain a single organic solvent satisfying all these requirements, a mixed solvent may be used including, for example, an organic solvent with a high dielectric constant and an organic solvent with a low viscosity.

When using a carbonate-based polar nonaqueous solvent, the carbon of an anode and an electrolyte in the lithium secondary battery react with each other during the initial charging to form a passivation layer such as a solid electrolyte interface (SEI) film on a negative electrode surface by an irreversible reaction. The SEI film enables the battery to be stably charged and discharged without further decomposition of the electrolytic solution (J. Power Sources, 51 (1994), 79-104). The SEI film also acts as an ion tunnel through which only lithium ions pass, and prevents cointercalation of an organic solvent, which solvates the lithium ions and moves with the lithium ions into a carbon anode, thereby preventing a breakdown of the anode structure.

However, since a high voltage of 4 V or greater is repeatedly produced during charging and discharging, the SEI film prepared with the polar solvent and lithium salt cannot function ideally. The SEI film can develop cracks, a reduction reaction occurs, insoluble salts form inside and outside the anode, gas is generated, and thus cracks occur in the anode structure. The electronic connection deteriorates because of such cracks in the structure of the anode. Therefore, the inner resistance increases and the capacity of the battery decreases.

Since the solvent decomposes and the amount of the electrolyte decreases, the electrolyte in the battery is depleted and sufficient ions cannot be transferred.

SUMMARY OF THE INVENTION

The present invention provides an organic electrolytic solution capable of improving a capacity retention ratio, thereby ensuring reliability of a battery.

The present invention also provides a lithium battery which employs the organic electrolytic solution.

According to an aspect of the present invention, an organic electrolytic solution includes: a lithium salt; a mixed organic solvent comprising a mixture of a high dielectric constant solvent and a low boiling point solvent; and a compound represented by formula (1):

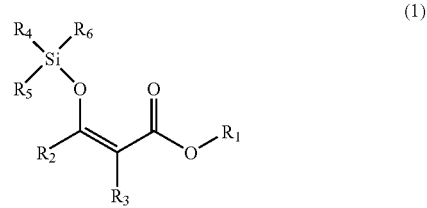

(1)

where $R_1$ is selected from a hydrogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; $R_2$ and $R_3$ are each independently selected from a hydrogen atom, a halogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; and $R_4$, $R_5$ and $R_6$ are each independently selected from a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

In another embodiment, the compound represented by formula (1) may be a compound represented by formula (2):

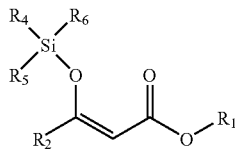

(2)

where $R_1$, $R_2$, and $R_4$ through $R_6$ are defined above.

In still another embodiment, the compound represented by formula (1) may be a compound represented by formula (3):

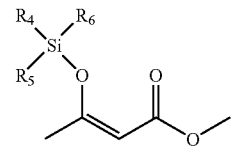

(3)

where $R_4$ through $R_6$ are defined above.

In yet another embodiment, the compound represented by formula (1) may be a compound represented by formula (4):

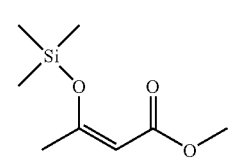

(4)

In an embodiment, the amount of the compound of formulae (1) through (4) may be from 0.1 to 10% by weight based on the weight of the organic solvent.

In another embodiment, the amount of the compound of formulae (1) through (4) may also be from 1 to 5% by weight based on the weight of the organic solvent.

In an embodiment, the concentration of the lithium salt may be from 0.5 to 2.0 M.

Examples of the high dielectric constant solvent include ethylene carbonate, propylene carbonate, butylene carbonate, γ-butyrolactone, and mixtures thereof.

Examples of the low boiling point solvent include dimethyl carbonate, ethylmethyl carbonate, diethyl carbonate, dipropyl carbonate, dimethoxyethane, diethoxyethane, fatty acid ester derivatives, and mixtures thereof.

According to another embodiment of the present invention, a lithium battery includes: a cathode; an anode; and the organic electrolytic solution described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
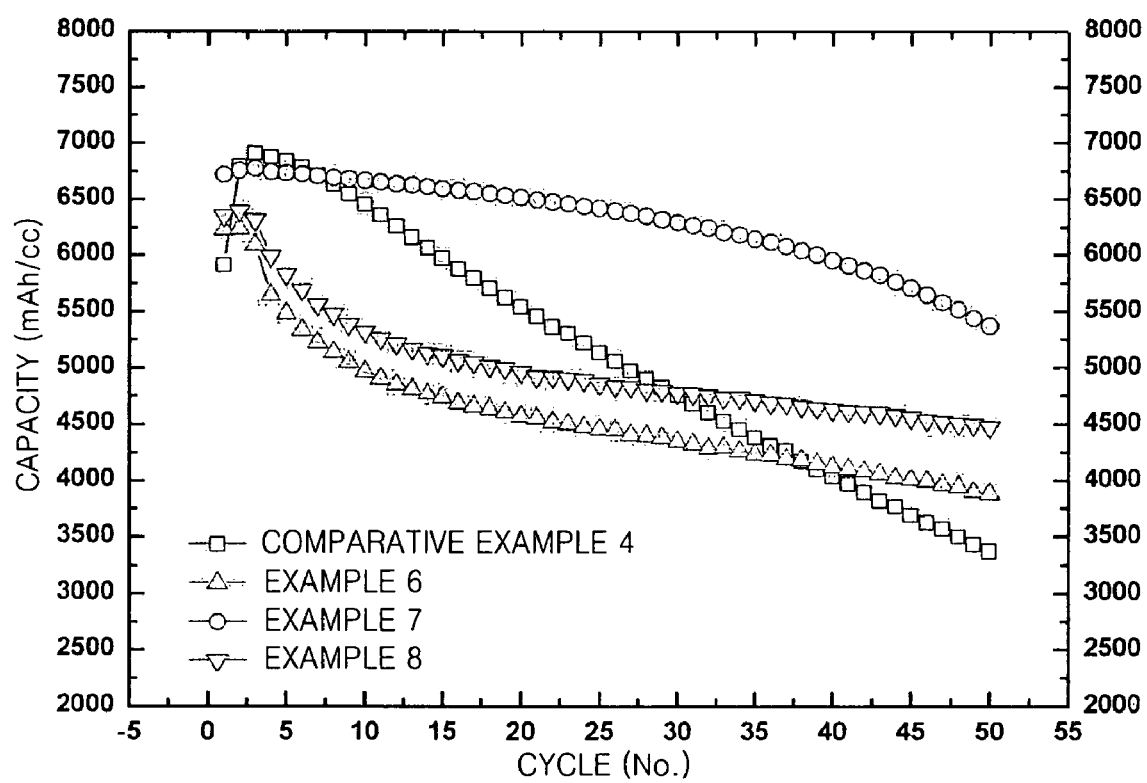
FIG. 1 is a graph of the capacity retention ratio according to the number of cycles of the lithium batteries of Examples 6 to 8 and Comparative Example 4.

Hereinafter, the present invention will be described more fully with reference to the accompanying drawing.

Organic electrolytic solutions and lithium batteries employing the organic electrolytic solutions according to embodiments of the present invention relatively suppress a reduction decomposition of a polar solvent to improve the capacity retention of the batteries. Thus, the charge/discharge efficiency and lifespan of the battery can be improved.

According to one embodiment, the organic electrolytic solution includes a lithium salt, a mixed organic solvent including a high dielectric constant solvent and a low boiling point solvent, and a compound represented by formula (1):

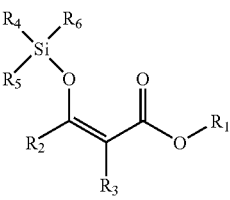

(1)

where $R_1$ is selected from a hydrogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; $R_2$ and $R_3$ are each independently selected from a hydrogen atom, a halogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; and $R_4$, $R_5$ and $R_6$ are each independently selected from a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

Theoretical reactions of the compound represented by formula (1) in the battery will be described in more detail. However, such description is for the purpose of providing a more complete understanding of the invention, the invention is not intended to be limited by such description, and applicants do not wish to be bound by the theories set forth.

The compound of formula (1) may accept electrons from the electrode more easily than a polar solvent. The compound can be reduced at a lower voltage than the polar solvent, and thus the compound may initiate a reduction before the solvent is reduced by the electrode. The compound of formula (1) has two functional groups including a carbon-carbon double bond group and a siloxy group represented by $Si(R)_3O$— in which electrons are accepted from the surface of the anode and an electronic chemical reaction occurs.

First, the carbon-carbon double bond in the compound breaks after receiving electrons from the surface of the anode and the compound becomes a radical. The radical reacts with another radical of the compound of formula (1) and forms a dimer radical. In this way, a chain reactions occurs, a polymer is formed, and a film is formed on the surface of the anode.

The functional group including the siloxy group is reduced by the electron and separated as a radical. The radical affects the characteristics of the SEI film formed on the surface of the anode through a reaction with the surface of the electrode or the polar solvent molecule. For example, when the alkylsiloxy group is reduced, the carbon-oxygen bond is cleaved to a radical or an anion, the alkylsiloxy group binds with the lithium ion and forms an insoluble salt compound. The salt compound precipitates at the surface of the carbon electrode, which is the anode. The salt compound reacts with various functional groups or the carbon anode, and thereby forms a covalent bond, or is adsorbed onto the surface of the electrode.

The reactions help to maintain a strong SEI film after charging and discharging over a long period by forming the SEI film with a different composition than when using only the polar organic solvent. The changed strong SEI film effectively prevents the organic solvent from entering the anode during the intercalation of the lithium ions, thereby effectively preventing contact between the organic solvent and the anode. Therefore, the reversibility of the charging and discharging, and the efficiency of the battery can be improved.

In one embodiment, the compound represented by formula (1) may be a compound represented by formula (2):

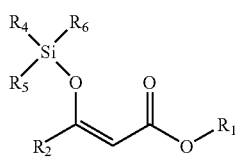

(2)

where $R_1$, $R_2$ and $R_4$ through $R_6$ are defined above. The compound of formula (2) is obtained when $R_3$ of formula (1) is hydrogen and the compound of formula (2) includes a crotonate structure as a central structure.

In another embodiment, the compound represented by formula (1) may be a compound represented by formula (3):

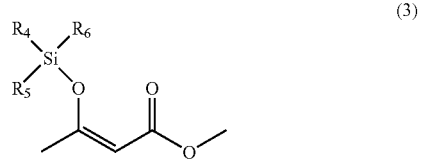

(3)

where $R_4$ through $R_6$ are defined above. The compound of formula (3) is obtained when $R_1$ and $R_2$ are substituted by methyl groups.

In another embodiment, the compound represented by formula (1) may be a compound represented by formula (4) below.

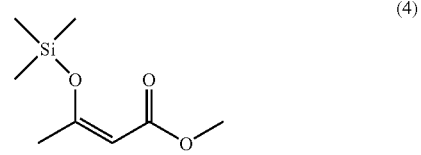

(4)

The compound of formula (4) includes a crotonate structure when one end is substituted by a trimethylsilyl group.

In one embodiment, the amount of the compound represented by one of formulae (1) to (4) may be from 0.1 to 10% by weight based on the weight of the organic solvent. In another embodiment, the amount of the compound represented by one of formulae (1) to (4) may be from 1 to 5% by weight, and in still another embodiment is from 2 to 4% by weight. When the amount of the compound exceeds 10% by weight, the charge and discharge characteristics are poor since there is an insufficient amount of an effective material on which the performance of a battery depends. When the amount of the compound is less than 0.1% by weight, the desired effects of the present invention cannot be obtained.

The high dielectric constant solvent is not particularly restricted and any known high dielectric constant solvent may be used. Examples include cyclic carbonates such as ethylene carbonate, propylene carbonate, and butylene carbonate, γ-butyrolactone, etc.

Similarly, the low boiling point solvent is not particularly restricted and any known low boiling point solvent may be used. Examples include aliphatic carbonates such as dimethyl carbonate, ethylmethyl carbonate, diethyl carbonate, and dipropyl carbonate, dimethoxyethane, diethoxyethane, fatty acid ester derivatives, etc.

In one embodiment, the volumetric ratio of the high dielectric constant solvent to the low boiling point solvent may be from 1:1 to 1:9. When the ratio is outside of this range, the discharge capacity and charge/discharge cycle life of the battery may degrade.

The lithium salt is any lithium salt that is commonly used in a lithium battery and may include at least one compound selected from $LiClO_4$, $LiCF_3SO_3$, $LiPF_6$, $LiN(CF_3SO_2)$, $LiBF_4$, $LiC(CF_3SO_2)_3$ and $LiN(C_2F_5SO_2)_2$.

The concentration of the lithium salt in the organic electrolytic solution may be from 0.5 to 2.0 M. When the concentration of the lithium salt is less than 0.5 M, the conductivity of the electrolytic solution is low, thereby degrading the performance of the electrolytic solution. When the concentration of the lithium salt is greater than 2.0 M, the viscosity of the electrolytic solution is high, and thus the mobility of lithium ions is low.

A lithium battery employing the organic electrolytic solution and a method of manufacturing the same will now be described.

A lithium battery according to an embodiment of the present invention includes a cathode, an anode, and the organic electrolytic solution according to the previous embodiment.

The lithium battery is not particularly restricted and may be a lithium primary battery or a lithium secondary battery, such as a lithium ion battery, a lithium ion polymer battery, or a lithium sulfur battery.

Figure 2:
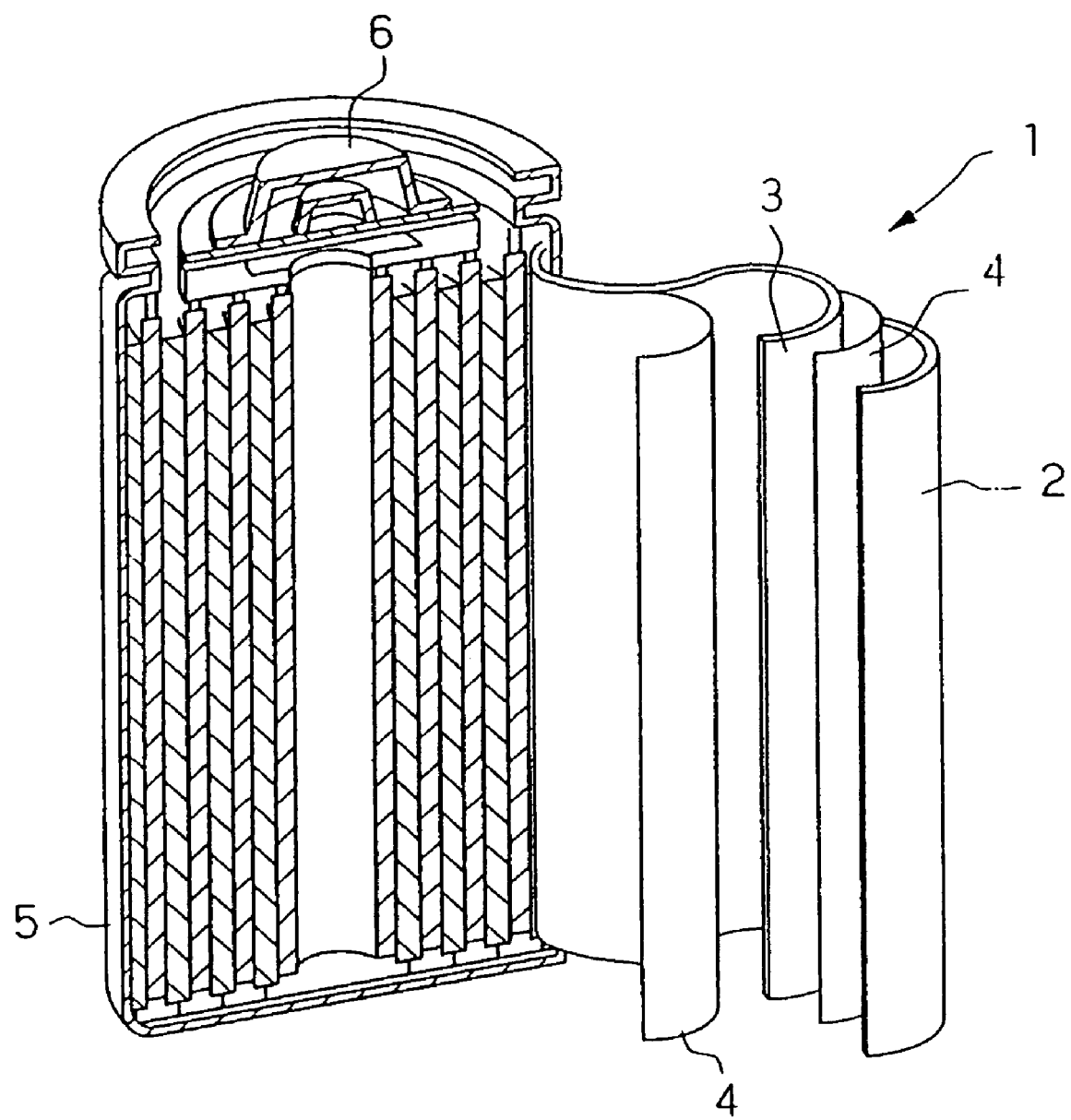
FIG. 2 is a battery including an electrolyte of the present invention.

In an embodiment of the present invention, a lithium battery is provided which includes the improved electrolytic solution described above. As shown in FIG. 2, the lithium battery 1 comprises an anode 2, a cathode 3 and a separator 4 positioned between the anode 2 and cathode 3. The anode 2, cathode 3 and separator 4 are wound together to form an electrode assembly. The electrode assembly is enclosed within a battery case 5 along with an electrolytic solution as described above, and is sealed with a cap assembly 6.

Referring again to the electrolytic solution, the alkyl group as a substituent may include a linear or branched radical having from 1 to 20 carbon atoms. In another embodiment, the alky group may include a linear or branched radical having from 1 to 12 carbon atoms. For example, the alkyl radical may be a lower alkyl having from 1 to 6 carbon atoms. Such an alkyl radical may be one of methyl, ethyl, n-propyl, iso-propyl, n-butyl, isobutyl, sec-butyl, t-butyl, pentyl, iso-amyl, hexyl, etc. A lower alkyl radical having from 1 to 3 carbon atoms can also be used.

The alkoxy group as a substituent may include a linear or branched radical having alkyl moiety consisting of 1 to 20 carbon atoms and an oxygen atom. For example, the alkoxy radical may be a lower alkoxy radical having from 1 to 6 carbon atoms. Such an alkoxy radical may be one of methoxy, ethoxy, propoxy, butoxy and t-butoxy. A lower alkoxy radical having from 1 to 3 carbon atoms can also be used. Such an alkoxy radical can further be substituted by at least one halo atom such as fluoro, chloro, bromo, etc. to provide a haloalkoxy radical. A lower haloalkoxy radical having from 1 to 3 carbon atoms can also be used. Such a radical may be one of fluoromethoxy, chloromethoxy, trifluoromethoxy, trifluoroethoxy, fluoroethoxy and fluoropropoxy.

The alkenyl group as a substituent is a linear or branched aromatic hydrocarbon group having from 2 to 30 carbon atoms and a double bond between carbon atoms. The alkenyl group may have 2 to 12 carbon atoms, for example 2 to 6 carbon atoms. The branched alkenyl group is a linear alkenyl group having at least one lower alkyl or lower alkenyl group added. The alkenyl group may be unsubstituted or may be substituted by at least one of the groups including, but not limited to, halo, carboxy, hydroxy, formyl, sulfo, sulfino, carbamoyl, amino and imino. Such an alkenyl group may be one of ethenyl, propenyl, carboxy ethenyl, carboxypropenyl, sulfino ethenyl and sulfonoethenyl.

The aryl group as a substituent is used alone or in a combination, and is a carbocyclic aromatic system having from 6 to 20 carbon atoms and one or more rings. The rings may be attached or fused together using a pendent method. The term "aryl" includes aromatic radicals such as phenyl, naphthyl, tetrahydronaphthyl, indane and biphenyl. For example, the aryl group may be phenyl. The aryl group may have 1 to 3 substituents such as hydroxyl, halo, haloalkyl, nitro, cyano, alkoxy and lower alkylamino.

The aryloxy group as a substituent may be aryl —O—. The definition of the term aryl in the aryloxy group is described above.

The heteroaryl group as a substituent is a monovalent monocyclic or bicyclic aromatic radical that includes 1, 2 or 3 hetero atoms selected from N, O or S and includes a ring composed of from 6 to 20 carbon atoms. The heteroaryl group may be a monovalent monocyclic or bicyclic aromatic radical in which at least one of the hetero atoms is oxidized or quaternarized to form, for example, an N-oxide or a quaternary salt. Examples of the heteroaryl group include thienyl, benzothienyl, pyridyl, pyrazinyl, pyrimidinyl, pyridazinyl, quinolinyl, quinoxalinyl, imidazolyl, furanyl, benzofuranyl, thiazolyl, isoxazolyl, benzisoxazolyl, benzimidazolyl, triazolyl, pyrazolyl, pyrolyl, indolyl, 2-pyridonyl, 4-pyridonyl, N-alkyl-2-pyridonyl, pyrazinonyl, pyridazynonyl, pyrimidinonyl, oxazolonyl, corresponding N-oxides thereof (e.g., pyridyl N-oxide, quinolinyl N-oxide), and quaternary salts thereof, but are not limited thereto.

The heteroaryloxy group as a substituent may be heteroaryl —O— and the definition of heteroaryl of the heteroaryloxy group is as disclosed above.

The lithium battery of an embodiment of the present invention can be manufactured as follows.

First, a cathode active material, a conducting agent, a binder and a solvent are mixed to prepare a cathode active material composition. The cathode active material composition is directly coated on an aluminum current collector and dried to prepare a cathode plate. Alternatively, the cathode active material composition is cast on a separate substrate to form a cathode active material film and the film is peeled from the substrate and laminated to an aluminum current collector to prepare a cathode plate.

The cathode active material is any lithium containing metal oxide that is commonly used in the art and examples include $LiCoO_2$, $LiMn_xO_{2x}$, $LiNi_{x-1}Mn_xO_{2x}$ (where x=1 or 2), $Ni_{1-x-y}Co_xMn_yO_2$ (where $0 \leq x \leq 0.5$ and $O<y<0.5$), etc.

Carbon black may be used as the conducting agent. The binder may be a vinylidene fluoride/hexafluoropropylene copolymer, polyvinylidene fluoride, polyacrylonitrile, polymethylmethacrylate, polytetrafluoroethylene, a mixture thereof, or a styrene butadiene rubber-based polymer. The solvent may be one of N-methylpyrrolidone, acetone, water, etc. The amounts of the cathode active material, the conducting agent, the binder and the solvent are well known in the art.

Similarly, an anode active material, a conducting agent, a binder and a solvent are mixed to prepare an anode active material composition. The anode active material composition is directly coated on a copper current collector, or is cast on a separate substrate to form an anode active material film and the film is then peeled from the substrate and laminated to a copper current collector to obtain an anode plate. The amounts of the anode active material, the conducting agent, the binder and the solvent are well known in the art.

Silicon metal, a silicon thin film, lithium metal, a lithium alloy, carbonous material or graphite may be used as the anode active material. The conducting agent, the binder and the solvent in the anode active material composition are the same as those in the cathode active material composition. If desired, a plasticizer may be added to the cathode active material composition and the anode active material composition to produce pores in the electrode plates.

The separator may be composed of any material that is commonly used in a lithium battery. A material having a low resistance to the movement of ions of the electrolyte and a good ability to absorb the electrolytic solution may be used.

For example, the material may be a non-woven or woven fabric selected from the group consisting of glass fiber, polyester, polyethylene, polypropylene, polytetrafluoroethylene (PTFE, for example, TEFLON@) or a combination thereof. More specifically, a lithium ion battery uses a windable separator composed of one of polyethylene, polypropylene, etc., and a lithium ion polymer battery uses a separator having an excellent ability to impregnate an organic electrolytic solution. The separator may be prepared using the following method.

A polymer resin, a filler and a solvent are mixed to prepare a separator composition. The separator composition is directly coated on an electrode and dried to form a separator film. Alternatively, the separator composition is cast on a substrate and dried to form a separator film and the film is peeled from the substrate and laminated to an electrode.

The polymer resin is not particularly restricted and can be any material that is used in a conventional binder for an electrode plate. Examples of the polymer resin include vinylidenefluoride/hexafluoropropylene copolymers, polyvinylidenefluoride, polyacrylonitrile, polymethylmethacrylate and mixtures thereof. In particular, vinylidenefluoride/hexafluoropropylene copolymers containing 8 to 25% by weight of hexafluoropropylene can be used.

The separator is interposed between the cathode plate and the anode plate to form a battery assembly. The battery assembly is wound or folded and placed in a battery case that may be cylindrical, rectangular, or of various other shapes. Then, the organic electrolytic solution according to an embodiment of the present invention is injected into the battery case to complete the lithium ion battery.

Alternatively, a battery assembly is prepared in the form of a bicell and the organic electrolytic solution according to an embodiment of the present invention is impregnated therein. Then, the assembly is placed in a pouch and sealed to complete the lithium ion polymer battery.

The present invention will now be described in greater detail with reference to the following examples. However, the examples are for illustrative purposes only and are not intended to limit the scope of the invention.

EXAMPLE 1

Preparation of an Electrolytic Solution

1% by weight of methyl-3-trimethylsilyloxycrotonate represented by formula (4) was added as an additive to an organic solvent mixture containing 30% by volume of ethylene carbonate and 70% by volume of diethyl carbonate, and 1.3 M $LiPF_6$ was used as a lithium salt to prepare an organic electrolytic solution.

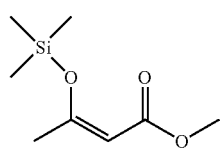
(4)

EXAMPLE 2

Preparation of an Electrolytic Solution

An organic electrolytic solution was prepared in the same manner as in Example 1, except that 3% by weight of methyl-3-trimethylsilyloxycrotonate represented by formula (4) was used.

EXAMPLE 3

Preparation of an Electrolytic Solution

An organic electrolytic solution was prepared in the same manner as in Example 1, except that 5% by weight of methyl-3-trimethylsilyloxycrotonate represented by formula (4) was used.

EXAMPLE 4

Preparation of an Electrolytic Solution

An organic electrolytic solution was prepared in the same manner as in Example 1, except that 0.1% by weight of methyl-3-trimethylsilyloxycrotonate represented by formula (4) was used.

EXAMPLE 5

Preparation of an Electrolytic Solution

An organic electrolytic solution was prepared in the same manner as in Example 1, except that 10% by weight of methyl-3-trimethylsilyloxycrotonate represented by formula (4) was used.

COMPARATIVE EXAMPLE 1

Preparation of an Electrolytic Solution

An organic solvent mixture containing 30% by volume of ethylene carbonate and 70% by volume of diethyl carbonate and 1.3 M $LiPF_6$ as a lithium salt were used to prepare an organic electrolytic solution without an additive.

COMPARATIVE EXAMPLE 2

Preparation of an Electrolytic Solution

An organic electrolytic solution was prepared in the same manner as in Example 1, except that 20% by weight of methyl-3-trimethylsilyloxycrotonate represented by formula (4) was additionally used.

COMPARATIVE EXAMPLE 3

Preparation of an Electrolytic Solution

An organic electrolytic solution was prepared in the same manner as in Example 1, except that 0.01% by weight of methyl-3-trimethylsilyloxycrotonate represented by formula (4) was additionally used.

EXAMPLES 6 TO 10

Preparation of Lithium Batteries

Batteries were prepared using a silicon thin film to form the anodes. An amorphous silicon film was formed on the surface of a 20 μm thick rolled copper foil using radio frequency (RF) sputtering. The thickness of the thin film electrode was 0.15 μm.

Lithium was used to form the counter electrodes. Lithium was coated to a thickness of 100 μm on a 20 Mm thick copper foil and roll-pressed to obtain a 120 μm thick lithium electrode.

Pouch cells were prepared, each using a 1×2 cm² anode, a separator, the lithium electrode as a counter electrode and the organic electrolytic solutions respectively prepared in Examples of 1 to 5.

COMPARATIVE EXAMPLES 4 to 6

Preparation of Lithium Batteries

Pouch cells were prepared in the same manner as in Example 6 except that the organic electrolytic solution prepared in Comparative Examples 1 to 3 were used.

EXPERIMENTAL EXAMPLE 1

Cycle Characteristics of the Batteries

The lithium electrodes of the pouch cells manufactured in Examples 6 to 10 and Comparative Examples 4 to 6 were charged with a constant current of 50 mA per 1 g of the active material until the cell reached 0.01 V. Then, they were charged with a constant voltage of 0.01 V until the current was reduced to 5 mA per 1 g of the active material. In the first to third cycles, charging and discharging were performed at a rate of 0.2 C. to form an SEI film easily. From the fourth cycle, the charge and discharge were performed at a rate of 0.5 C. The capacity retention ratio indicates the ratio of the capacity of the given cycle to the capacity of the third cycle. The results are illustrated in Table 1 and the results of Examples 6 to 8 and Comparative Example 4 are illustrated in FIG. 1.

TABLE 1

|  | Discharge capacity of 3rd cycle [mAh/cc] | Discharge capacity of 50th cycle [mAh/cc] | Capacity retention ratio of 50$^{th}$ cycle (%) |
|---|---|---|---|
| Example 6 | 2673 | 1666 | 62.3 |
| Example 7 | 2883 | 2304 | 79.9 |
| Example 8 | 2724 | 1919 | 70.5 |
| Example 9 | 2620 | 1650 | 63 |
| Example 10 | 2840 | 1846 | 65 |
| Comparative Example 4 | 2536 | 1446 | 57 |
| Comparative Example 5 | 2550 | 1440 | 56.5 |
| Comparative Example 6 | 2600 | 1508 | 58 |

As indicated in Table 1, the capacity retention ratio after 50 cycles was less than 60% in Comparative Example 4 in which an additive was not included. However, the capacity retention ratio of Examples 6 to 10 was higher than 60%, showing improved charge and discharge characteristics, and the capacity retention ratio of Example 7 was almost 80%. The difference between the capacity retention ratios is assumed to depend on the degree to which side reactions during the charging and discharging were suppressed due to the SEI film structure formed in the initial charging and discharging. When the additive of the present invention is used, the SEI film is firm and dense, cracks in the film are suppressed, even after long term usage, reactions between the anode and the solvent are effectively prevented, and thus charge and discharge is more reversible, thus improving the capacity retention ratio. The capacity retention ratios were less than 60% in Comparative Examples 5 and 6 and these results are assumed to be caused by the same reasons described above.

The organic electrolytic solution and the lithium battery employing the same of the present invention relatively suppress the reduction decomposition of a polar solvent and decrease irreversible capacity in the first cycle. Thus, the charge/discharge efficiency, lifespan and reliability of the battery can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An organic electrolytic solution comprising:
a lithium salt;
an organic solvent comprising a high dielectric constant solvent and a low boiling point solvent; and a compound represented by formula (1):

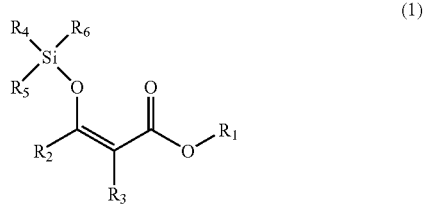

where:
R$_1$ is selected from the group consisting of a hydrogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms;
R$_2$ and R$_3$ are each independently selected from the group consisting of a hydrogen atom, a halogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; and
R$_4$, R$_5$ and R$_6$ are each independently selected from the group consisting of a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

2. The organic electrolytic solution of claim 1, wherein the compound represented by formula (1) is a compound represented by formula (2):

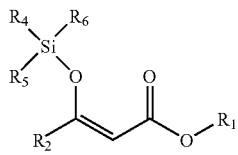

(2)

where $R_1$, $R_2$ and $R_4$ through $R_6$ are defined as in claim 1.

3. The organic electrolytic solution of claim 1, wherein the compound represented by formula (1) is a compound represented by formula (3):

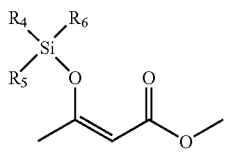

(3)

where $R_4$ through $R_6$ are defined as in claim 1.

4. The organic electrolytic solution of claim 1, wherein the compound represented by formula (1) is a compound represented by formula (4):

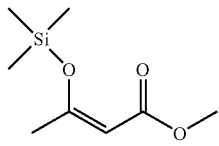

(4)

5. The organic electrolytic solution of claim 1, wherein the amount of the compound of formula (1) is from 0.1 to 10% by weight based on the weight of the organic solvent.

6. The organic electrolytic solution of claim 1, wherein the amount of the compound of formula (1) is from 1 to 5% by weight based on the weight of the organic solvent.

7. The organic electrolytic solution of claim 1, wherein the concentration of the lithium salt is from 0.5 to 2.0 M.

8. The organic electrolytic solution of claim 1, wherein the high dielectric constant solvent includes at least one solvent selected from the group consisting of ethylene carbonate, propylene carbonate, butylenes carbonate, and γ-butyrolactone.

9. The organic electrolytic solution of claim 1, wherein the low boiling point solvent includes at least one solvent selected from the group consisting of dimethyl carbonate, ethylmethyl carbonate, diethyl carbonate, dipropyl carbonate, dimethoxyethane, diethoxyethane, and fatty acid ester derivatives.

10. A lithium battery comprising a cathode, an anode, a lithium salt; and an electrolytic solution comprising:
an organic solvent comprising a high dielectric constant solvent and a low boiling point solvent; and
a compound represented by formula (1):

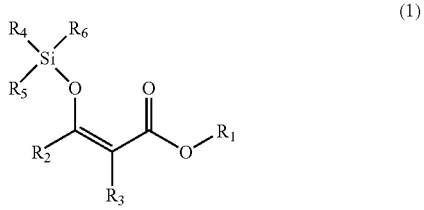

(1)

where:
$R_1$ is selected from the group consisting of a hydrogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms;

$R_2$ and $R_3$ are each independently selected from the group consisting of a hydrogen atom, a halogen atom, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms; and $R_4$, $R_5$ and $R_6$ are each independently selected from the group consisting of a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 1 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

11. The lithium battery of claim 10, wherein the compound represented by formula (1) is a compound represented by formula (2):

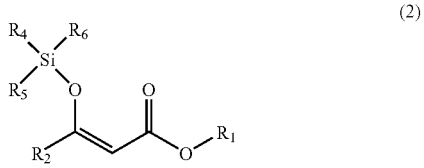

(2)

where $R_1$, $R_2$ and $R_4$ through $R_6$ are defined as in claim 10.

12. The lithium battery of claim 10, wherein the compound represented by formula (1) is a compound represented by formula (3):

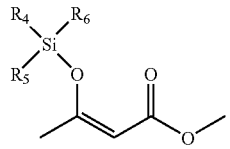

(3)

where $R_4$ through $R_6$ are defined as in claim 10.

13. The lithium battery of claim 10, wherein the compound represented by formula (1) is a compound represented by formula (4):

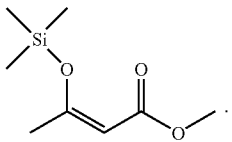

(4)

14. The lithium battery of claim 10, wherein the amount of the compound of formula (1) is from 0.1 to 10% by weight based on the weight of the organic solvent.

15. The lithium battery of claim 10, wherein the amount of the compound of formula (1) is from 1 to 5% by weight based on the weight of the organic solvent.

16. The lithium battery of claim 10, wherein the concentration of the lithium salt is from 0.5 to 2.0 M.

17. The lithium battery of claim 10, wherein the high dielectric constant solvent includes at least one solvent selected from the group consisting of ethylene carbonate, propylene carbonate, butylenes carbonate, and γ-butyrolactone.

18. The lithium battery of claim 10, wherein the low boiling point solvent includes at least one solvent selected from the group consisting of dimethyl carbonate, ethylmethyl carbonate, diethyl carbonate, dipropyl carbonate, dimethoxyethane, diethoxyethane, and fatty acid ester derivatives.

* * * * *